United States Patent
Costa-Requena et al.

(10) Patent No.: US 7,346,341 B2
(45) Date of Patent: Mar. 18, 2008

(54) PROVIDING MOBILE-SPECIFIC SERVICES FOR MOBILE DEVICES VIA AD-HOC NETWORKS

(75) Inventors: Jose Costa-Requena, Helsinki (FI); Inmaculada Espigares, Helsinki (FI)

(73) Assignee: Nokia Corporation, Espoo (FI)

( * ) Notice: Subject to any disclaimer, the term of this patent is extended or adjusted under 35 U.S.C. 154(b) by 217 days.

(21) Appl. No.: 11/009,375

(22) Filed: Dec. 10, 2004

(65) Prior Publication Data
US 2006/0128364 A1    Jun. 15, 2006

(51) Int. Cl.
*H04Q 7/20* (2006.01)
(52) U.S. Cl. .................. 455/414.3; 455/414.1
(58) Field of Classification Search ............ None
See application file for complete search history.

(56) References Cited

U.S. PATENT DOCUMENTS 6,816,912 B1 * 11/2004 Borella et al. ............ 709/238
2001/0003191 A1 * 6/2001 Kovacs et al. ............ 709/226
2002/0133581 A1    9/2002 Schwartz et al.
2004/0072557 A1    4/2004 Paila et al.
2005/0193106 A1 * 9/2005 Desai et al. .............. 709/223
2005/0220139 A1 * 10/2005 Aholainen ................ 370/466
2005/0232186 A1 * 10/2005 Karaoguz et al. ........ 370/328

FOREIGN PATENT DOCUMENTS

GB    2 388 455 A    11/2003

* cited by examiner

*Primary Examiner*—Erika A. Gary
(74) *Attorney, Agent, or Firm*—Hollingsworth & Funk, LLC

(57) ABSTRACT

Mobile-specific services are provided to a mobile device coupled to a local area network. The local area network provides ad-hoc connectivity between consumer electronics devices. A service provider device is coupled to the local area network. A mobile-specific service is provided at least in part by the service provider device. The mobile-specific service is advertised via the local area network. The mobile device subscribes to the mobile-specific service via the local area network in response to advertising of the mobile-specific service. The mobile device utilizes the mobile-specific service via the local area network.

37 Claims, 5 Drawing Sheets

PROVIDING MOBILE-SPECIFIC SERVICES FOR MOBILE DEVICES VIA AD-HOC NETWORKS

FIELD OF THE INVENTION

This invention relates in general to communications devices, and more particularly to communications devices configured for providing mobile-specific services on an ad hoc network.

BACKGROUND OF THE INVENTION

Mobile communications devices such as cell phones are becoming more popular due in part to the capabilities being added to such devices. Far from being simple voice communications tools, modern cell phones and related devices have become versatile digital communications and data processing tools. These devices form an important niche in the growing field of personal digital communications.

One factor that is expected to increase the popularity of mobile devices is the development of third generation (3G) technologies. The designation 3G refers to a collection of standards and technologies that can be used in the near future to enhance performance and increase data speed on cell phone networks. In particular, 3G is an International Telecommunication Union (ITU) specification for the third generation of mobile communications technology. A 3G cell phone would, in theory, be compatible with the 3G languages or standards that support enhanced data speeds.

The 3G infrastructure aims to provide packet-switched data to a handheld terminal with data bandwidth measured in hundreds of Kbits/sec. It is intended that 3G will work over wireless air interfaces such as Code Division Multiple Access (CDMA), Wideband CDMA (W-CDMA), and the Time Division Multiple Access (TDMA) based General Packet Radio Service (GPRS). The latter interface is included in the Enhanced Data for GSM, Environment (EDGE) air interface that has been developed specifically to meet the bandwidth needs of 3G cell phones. One advantage of 3G networks is that they may allow connectivity with public Internet and with private Internet Service providers. Moreover, 3G networks have inter-networking functions compatible with Wireless Local Area Networks (WLAN) that will allow devices with WLAN cards to connect to 3G infrastructure and access mobile specific services.

Future 3G devices may include features that allow communication with other consumer electronics devices. For example, a standard known as Universal Plug and Play™ (UPnP) provides a way for disparate processing devices to exchange data. The UPnP standard defines an architecture for peer-to-peer network connectivity utilizing a wide variety of electronic devices. The UPnP standard includes standards for service discovery, and is mainly targeted for proximity or ad hoc networks.

Various contributors publish UPnP device and service descriptions, thus creating a way to easily connect devices and simplifying the implementation of networks. UPnP is designed to work in many environments, including the home, businesses, public spaces, and on devices attached to the Internet. The UPnP standard is an open architecture that leverages Web technologies and is designed to provide ad-hoc networking and distributed computing.

The UPnP model is designed to support zero-configuration networking and automatic discovery for a wide variety of device categories. This allows a device to dynamically join a network, obtain an IP address, convey its capabilities, and learn about the presence and capabilities of other devices. Other Internet protocols such as Dynamic Host Configuration Protocol (DHCP) and Domain Name Service (DNS) may optionally included in a UPnP network, although they are not required. A device can leave a UPnP network smoothly and automatically without leaving any unwanted state behind.

The UPnP architecture includes mechanisms for discovery of devices on the network and mechanisms for describing capabilities of those devices. The UPnP discovery protocol allows a device to advertise its services to control points on the network utilizing multicast messages. Multicasting refers to a sending a single copy of data to multiple recipients on an Internet Protocol (IP) network. Devices can multicast one or more service announcement messages. Each message describes an embedded device and/or service available from the message's originator. Other devices on the network listen on the multicast address for these service announcement messages. This information can be used to by the devices to utilize UPnP services.

It is the goal of UPnP to allow home electronics to be able to interact in order to further improve the usefulness of such electronics. Since a 3G communications device also has advanced data processing abilities, it is possible for such 3G devices to communicate via UPnP networks. Technology advances will soon produce extremely 3G portable devices that include high-speed data connectivity and advanced data processing. This will make such devices indispensable, both in and away from the user's homes. However, to more effectively allow these devices to communicate in non-mobile environments such as UPnP, adaptations to both the devices and the UPnP architecture may be desirable.

SUMMARY OF THE INVENTION

The present disclosure relates to a system, apparatus and method for exchanging data between a local network and a wireless device. In accordance with one embodiment of the invention, a method is described for exchanging data between a mobile device and a local area network. The network provides ad-hoc connectivity between consumer electronics devices. The method involves advertising, via the local area network, a mobile-specific service that is provided at least in part by a service provider device that is capable of being coupled to the local area network. The mobile-specific service is provided at least in part by the service provider device. A request from the mobile device to subscribe to the mobile-specific service is received at the service provider device in response to advertising of the mobile-specific service. The mobile-specific service is provided to the mobile device via the service provider device in response to the request In more particular embodiments, the method involves providing the mobile-specific service by accessing, via the service provider, a server entity configured to provide the mobile specific service. The server entity may be located within and/or outside of the local area network. In one arrangement, the local area network includes a Universal Plug and Play network. In other arrangements, the mobile-specific service comprises a mobile messaging service, such as Short Message Service and/or Multimedia Message Service. The mobile-specific service may include a voice communication service, such as Session Initiation Protocol (SIP), Voice Over IP, SIP registrar service, SIP redirect service, and/or SIP proxy service.

In another configuration, the method may further involve receiving mobile-specific data at the service provider device via the mobile-specific service. Based on the mobile-specific data, translated data is formed that is specific to a consumer electronics device coupled to the local area network. The translated data is sent to the consumer electronics device via the local area network. Forming the translated data may involve forming a command configured to remotely operate the consumer electronics device. Forming the translated data may also involve forming multimedia data that is compatible with a rendering function of the consumer electronics device.

In other more particular embodiments, the method further involves receiving data at the service provider device via the local area network. The data is specific to a consumer electronics device coupled to the local area network. Based on the data, mobile-specific data that is compatible with the mobile-specific service is formed. The mobile-specific data is sent to the mobile device via the mobile-specific service. The mobile-specific data may include multimedia data that is compatible with a rendering function of the mobile device.

In another embodiment of the invention, a processor-readable medium includes instructions that are executable by a data processing arrangement capable of being coupled to a local area network. The local area network provides ad-hoc connectivity to consumer electronics devices. The instructions are executable by the data processing arrangement for advertising, via the local area network, a mobile-specific service that is provided at least in part by the data processing arrangement. In response to advertising the mobile-specific service, a request is received for the mobile-specific service from a mobile device that is configured to operate on the local area network. The mobile-specific service is provided to the mobile device via the local area network in response to the request.

In another embodiment of the invention, a processor-readable medium include instructions which are executable by a mobile data processing arrangement capable of being coupled to a local area network that provides ad-hoc connectivity to consumer electronics devices. The instructions are executable by the data processing arrangement for discovering, via the local area network, a mobile-specific service that is provided at least in part by a provider device coupled to the local area network. A request for the mobile-specific service is sent to the provider device via the local area network. The mobile-specific service is utilized via the provider device.

In another embodiment of the present invention, a system includes a local area network configured to provide ad-hoc data exchanges between consumer electronics devices capable of being coupled to the local area network. The system also includes: means for advertising, via the local area network, a mobile-specific service that is provided at least in part by a service provider device coupled to the local area network; means for causing a mobile device to subscribe to the mobile-specific service via the local area network; and means for causing the mobile device to utilize the mobile-specific service via the local area network.

In another embodiment of the present invention, an apparatus includes a network interface capable of being coupled to a local area network that provides ad-hoc connectivity to consumer electronics devices. A processor is coupled to the network interface. A memory is coupled to the processor, the memory contains instructions that cause the processor to advertise, via the local area network, a mobile-specific service that is provided at least in part by the apparatus. The instructions also cause the processor to receive a request for the mobile-specific service from a mobile device that is capable of operating on the local area network in response to advertising the mobile-specific service. The apparatus provides the mobile-specific service to the mobile device via the local area network in response to the request.

In another embodiment of the present invention, a mobile terminal includes a network interface capable of being coupled to a local area network that provides ad-hoc connectivity to consumer electronics devices. A processor is coupled to the network interface. A memory coupled to the processor. The memory contains instructions that cause the processor to discover, via the local area network, a mobile-specific service that is provided at least in part by a provider device coupled to the local area network. The instructions also cause the processor to send a request for the mobile-specific service to the provider device, and utilize the mobile-specific service via the provider device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
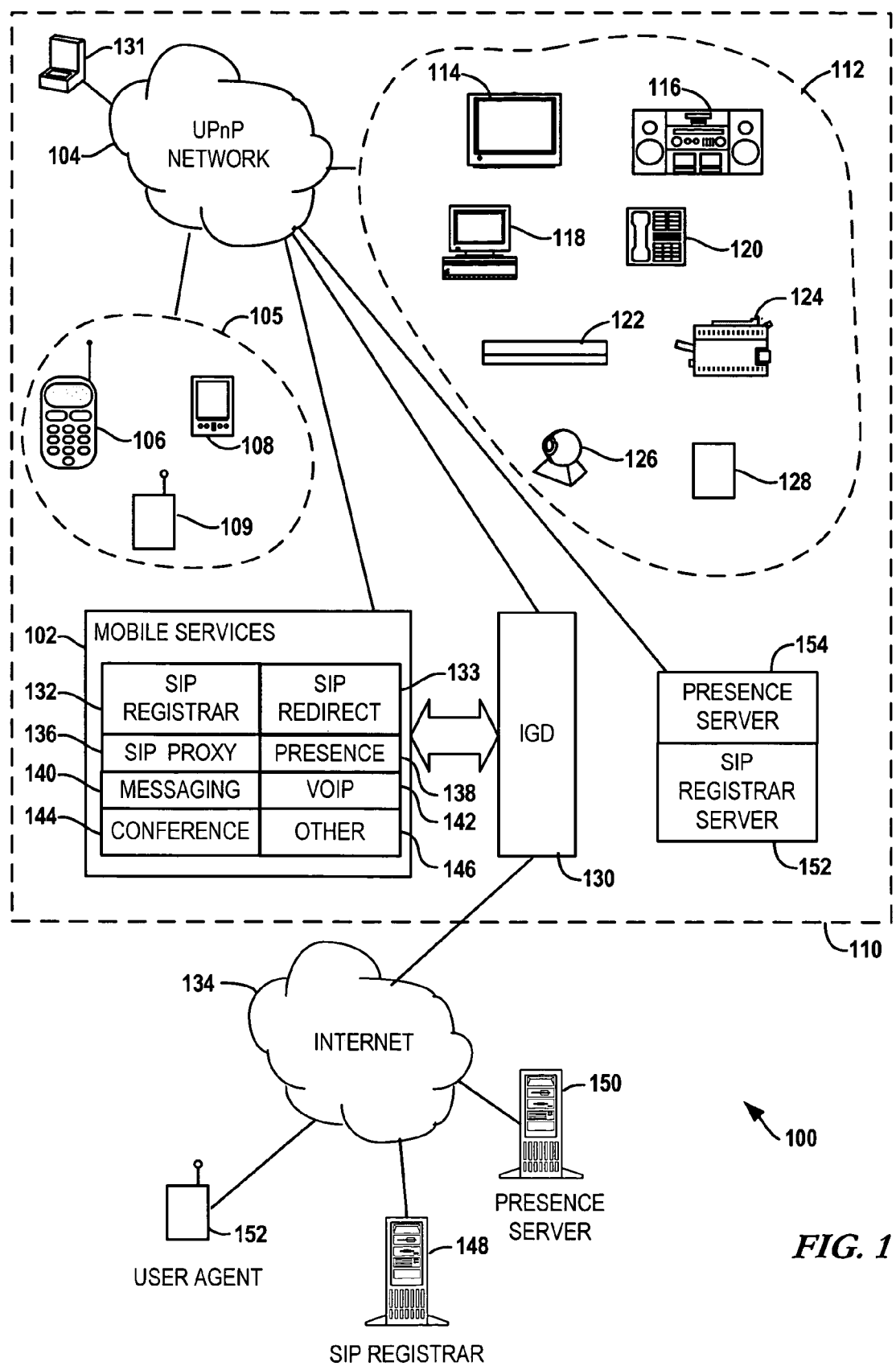
FIG. 1 illustrates a system for providing mobile-specific services on an ad-hoc local area network according to embodiments of the present invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention provides a way of providing mobile-specific services over an ad-hoc, consumer electronics-oriented network. The mobile services may include Voice over Internet Protocol (VoIP), Short Messaging Service (SMS), Multimedia Messaging Service (MMS), presence, etc. The mobile services may be implemented in an entity that is actively coupled to the network. In other arrangements, the services may be implemented in an externally located entity (e.g. mobile operator, Internet Service Provider, etc) but virtually represented in the local network by a device that announces the services locally in the home network. In one example, the services could be represented and/or provided by a dedicated mobile-services provider device. A mobile device with the capability to connect to the provider device via the home networks can take advantage of mobile-specific services that would normally be provided via cellular networks. The provider device may also provide connectivity between the mobile devices and consumer electronics coupled to the networks using the mobile-specific services.

The present invention is applicable in any type of communication systems and networks, particularly to proximity or ad-hoc networks that are adapted for consumer electronics use. In order to facilitate an understanding of the invention, the present invention is described in the context of a UPnP networking environment. It will be appreciated, however, that the invention may be applicable in any system or application where ad-hoc data communications between devices such as consumer and mobile electronics is desired.

As previously described, UPnP devices may advertise their capabilities by multicasting service announcement messages on the UPnP network. Entities connecting to a UPnP network are generally divided into two categories, devices and control points. Devices generally refer to any data processing arrangement that is capable of receiving, sending, manipulating, generating, rendering, or otherwise processing data available on a UPnP network. In the UPnP framework, the concept of a device is abstracted into a logical entity known as a logical device. A logical device is a container for both other logical devices and for services. For example, a UPnP television monitor could be considered to be a logical device that contains both a video renderer logical device and a sound renderer logical device. Each of these logical devices may have one or more associated services. The video renderer device, for example, may provide rendering services for both still and moving images. These services may support different input and output formats, resolutions, aspect ratios, etc.

Control points in a UPnP network enable users to control UPnP devices and their associated services. In particular, control points retrieve device and service descriptions, send actions to services, poll for state variables associated with services, and receive events generated by services. Control points and devices in a UPnP network are intended to have generic interfaces that allow flexible dynamic coupling between control points and devices.

In UPnP home networks, the available services may be found using service discovery. Service discovery involves utilizing discovery messages that are exchanged via predetermined multicast addresses on the UPnP network. These multicast addresses can be used to advertise services provided by UPnP devices. In addition, control points and other devices can multicast discovery messages to search for devices and services of interest. The search messages contain criteria that may be fulfilled by devices and/or services on the network. Devices that fulfill the criteria will respond to the search message. After the control point and the device have discovered each other, they may engage in a description process to more fully define the details of the available services.

Some of the services defined in UPnP include printing, remote user interface (UI), audio/video, etc. However, the services currently defined in the UPnP do not include mobile-specific services that are available on cellular phone networks, for example. These mobile-specific services may include VoIP, messaging (e.g., SMS, MMS), presence, multimedia services using Session Initiation Protocol (SIP) and Session Description Protocol (SDP), conferencing applications, whiteboarding, document sharing, etc.

It will be appreciated that users typically utilize mobile services on mobile devices while away from home. As users become more accustomed to and reliant on these mobile-specific services, it will be beneficial to utilize similar mobile services in the home environment. In some arrangements, the home network may provide services that are identical (at least to the user) to those provided by a cellular network, but utilize a different data pathway. For example, a cellular phone may have the ability to make VoIP calls over mobile networks. When the cellular phone is in the home, a home network may be used to make these VoIP calls via a cable modem connection. When the mobile device is at home it may register in the home VoIP server and the incoming calls to the fixed line can then be forwarded to the mobile device over the local network (e.g. WLAN, Bluetooth, UWB, etc).

The cellular phone may also utilize mobile services provided entirely with the home on the local network. For example, the home may have a presence server coupled to the local network that provides the same functionality as an external presence server, just in the home domain. In other scenarios, the cellular phone may utilize a mobile-specific service on the home network, but in a way that is unique to devices on that network. For example, the cellular phone may act as a control point for a UPnP device on the local network by sending an SMS message to a specially formed address. The phone may also act as proxy so that incoming data (e.g., a video call) can be forwarded to another UPnP device (e.g., a TV screen).

Illustrated in FIG. 1 is an example environment 100 for providing mobile-specific services over a home network according to embodiments of the present invention. A mobile services provider arrangement 102 provides access to mobile-specific services for devices that are capable of being coupled to a UPnP network 104. These UPnP-capable devices may include mobile devices 105, such as cellular phones 106, Personal Digital Assistants (PDA) 108, and any other mobile device as represented by generic mobile device 109.

The UPnP network 104 (or similar networking technology) allows devices to exchange data in a local environment 110. The local environment 110 typically includes a home or office, although it will be appreciated that other environments may provide UPnP connectivity, including automobiles, airplanes, boats, public wireless hotspots, etc. The UPnP network 104 may couple consumer electronics devices 112, including televisions 114, audio systems 116, computers 118, telephones 120 (e.g., analog phones, digital phones, cordless phones, SIP phones), digital media centers 122 (e.g., set-top boxes, MP3 jukeboxes, personal video recorders, media hubs), printers 124, cameras 126, and other devices, represented by generic UPnP device 128.

The consumer electronic devices 112 may be coupled to the UPnP network 104 in any manner known in the art. The UPnP network 104 may employ connectivity using any media or format known or later developed. For example, the UPnP network 104 may utilize any combination of wired and wireless networking technologies, such as Ethernet, 802.11 Wi-Fi, X10, powerline networking, infrared, etc. Generally, UPnP networks utilize TCP/IP and other Web technologies to enable proximity networking for transfer of control data and content among networked devices.

The UPnP network 104 may also be configured to provide communications outside the local environment 110. For example, an Internet Gateway Device (IGD) 130 may provide communications to networks outside the local environment, such as the Internet 134. The IGD 130 is an IP addressable device typically residing at the edge of a home or small-business network. The IGD 130 includes a WAN interface capable of accessing the Internet 134 and other external networks. The IGD 130 is configured to provide external network access to elements of the UPnP network 104. The IGD 130 may also provide local addressing and routing services between one or more LAN segments in the local environment 110. The IGD 130 can be located in a specific home device to provide external connectivity to all devices in the home network. In some cases, a mobile device 105 (e.g., mobile phone 106) can also act as IGD 130. Such devices 105 may have access to external wireless networks such as 3G, GPRS, UWB, etc.

The mobile devices 105 and the UPnP mobile services provider 102 may be configured to communicate with the UPnP network 104 in a manner similar to that of the consumer electronics devices 112. The mobile devices 105 may have direct wired or wireless connections to the network 104, or may have connections provided by an intermediary device such as a docking station 131. The mobile devices 105 may advertise certain non-mobile-specific services (e.g., audio rendering) and may utilize non-mobile-specific network services (e.g., file transfer to a storage device). The mobile devices 105 are also configured to utilize mobile-specific services via the UPnP network 104. The UPnP mobile services provider 102 is configured to provide, at least in part, the mobile-specific services to such mobile devices 105. It will be appreciated that the provider 102 may also provide and utilize other UPnP services, including those services not specific to mobile environments.

Generally, the UPnP mobile services provider 102 offers a selected set of mobile-specific services that are compatible with cellular and other mobile voice and data technologies. These services may include SIP services such as SIP registrar 132, SIP redirect 133, and SIP proxy 136. Other mobile services offered by the UPnP services provider 102 may include presence 138, messaging 140, VoIP 142, conferencing 144, and any other service 146 now known or later developed. The mobile devices 105 may be internally configured access these services in the same way as via a mobile/cellular network, except that the data path for these services is via the UPnP network 104.

The UPnP mobile services provider 102 may act as a proxy device for mobile-specific services. For example, the SIP registrar service 132 and presence service 138 may act as proxies to a SIP registrar server 148 and presence server 150, respectively, accessible via the Internet 134. Similarly, the SIP registrar service 132 and presence service 138 may act as proxies to a SIP registrar server 152 and presence server 154 located in the home network 104. The SIP proxy 136 may be accessed by SIP user agents 152 connected the Internet 134. The use of the SIP proxy 136 allows routing of SIP messages and multimedia sessions to devices connected to the UPnP network 104. User agents coupled the home network, such as the mobile devices 105, may also be able to utilize SIP signaling via the SIP proxy 136.

Figure 2:
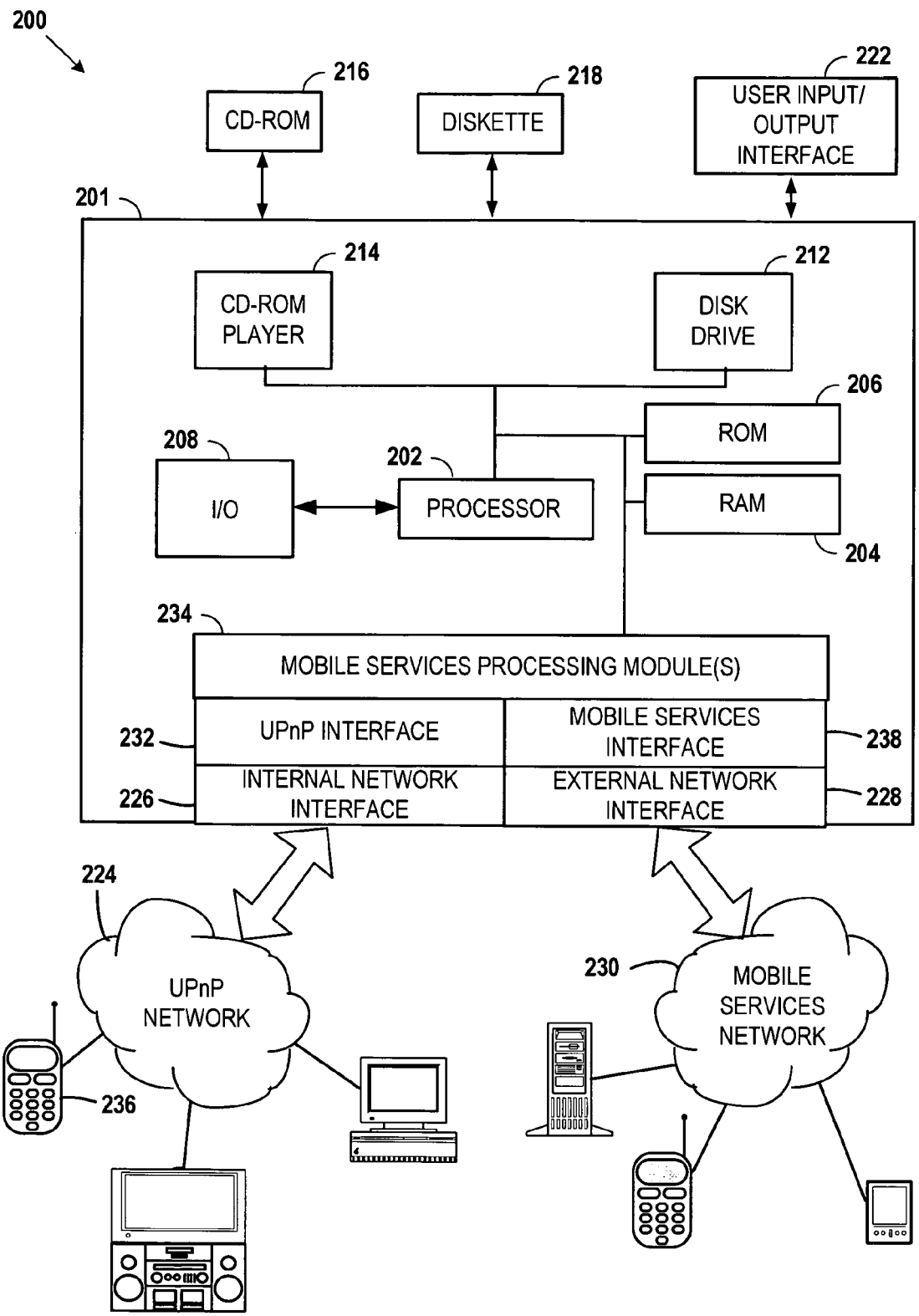
FIG. 2 illustrates a device for providing mobile-specific services on an ad-hoc local area network according to embodiments of the present invention.

The UPnP mobile services provider 102 may be implemented using any combination of hardware and software known in the art. The UPnP mobile services provider 102 may be implemented as a standalone device, a processor-implemented service, or be included as part of other electronic equipment, including computers, routers, wireless access points, set-top boxes, IGDs, etc. FIG. 2 shows an example computing structure 200 suitable for providing the functionality of a UPnP mobile services provider according to embodiments of the present invention.

The computing structure 200 includes a computing arrangement 201. The computing arrangement 201 may include custom or general-purpose electronic components. The computing arrangement 201 includes a central processor (CPU) 202 that may be coupled to random access memory (RAM) 204 and/or read-only memory (ROM) 206. The ROM 206 may include various types of storage media, such as programmable ROM (PROM), erasable PROM (EPROM), etc. The processor 202 may communicate with other internal and external components through input/output (I/O) circuitry 208. The processor 202 carries out a variety of functions as is known in the art, as dictated by software and/or firmware instructions.

The computing arrangement 201 may include one or more data storage devices, including hard and floppy disk drives 212, CD-ROM drives 214, and other hardware capable of reading and/or storing information such as tape, DVD, flash-memory drive, etc. In one embodiment, software for carrying out the operations in accordance with the present invention may be stored and distributed on a CD-ROM 216, diskette 218 or other form of media capable of portably storing information. These storage media may be inserted into, and read by, devices such as the CD-ROM drive 214, the disk drive 212, etc. The software may also be transmitted to computing arrangement 201 via data signals, such as being downloaded electronically via a network, such as the Internet.

The computing arrangement 201 may be coupled to a user input/output interface 222 for user interaction. The user input/output interface 222 may include apparatus such as a mouse, keyboard, microphone, touch pad, touch screen, voice-recognition system, monitor, LED display, LCD display, etc. The user interface 222 may include physical devices, or may be a pure virtual interface such as provided by Virtual Network Computing (VNC) software and similar technologies.

The computing arrangement 201 may be coupled to other computing devices via networks. In particular, the arrangement 201 may be locally coupled to a UPnP network 224 via an internal network interface 226. An external network interface 228 may also be included with the computing arrangement 201. The external interface 228 is generally used to communicate with elements outside the UPnP network 224, such as a mobile services network 230.

The network interfaces 226, 228 may include hardware and software components, including circuitry, firmware, drivers, programs, and protocol modules. It will be appreciated that the network interfaces 226, 228 may share the same hardware and/or software in providing their respective functions. For example, both interfaces 226, 228 may communicate via a single interface device coupled to the UPnP network 224. In such an arrangement, the external interface 228 may communicate externally by utilizing a UPnP IGD (e.g., IGD 130 in FIG. 1).

A UPnP interface 232 is coupled to the internal network interface 226 for purposes of dealing with formats and states required by the UPnP standard. The UPnP interface 232 may handle, for example, advertising and description of mobile-specific services on the UPnP network 224. These mobile-specific services will be of particular interest to UPnP-enabled mobile devices, because such devices are most likely able to exploit these services. The UPnP interface 232 may be a generic module that is adaptable to dynamically add new functionality. The actual mobile services functionality presented at the UPnP interface 232 may be provided by one or more mobile services processing modules 234.

The mobile services processing modules 234 provide the core functionality of one or more mobile-specific services that are offered via the UPnP interface 232. For example, the mobile services processing modules 234 may advertise a VoIP service over the UPnP network for use by a UPnP enabled cellular phone 236. The processing module 234 could be designed to operate much the same as VoIP service available on the mobile services network 230, except that the processing module 234 handles initiation and communications with the cellular phone 236 using the UPnP interface 232. The functions provided by a VoIP service module may include establishing and using session and signaling protocols, determining location of VoIP servers and PBX's, etc.

The data processed by the mobile services processing module 234 may be passed to a mobile services interface 238. The mobile services interface 238 handles the native protocols and formats required of the mobile services network 230. For example, if the mobile services processing modules 234 is configured for handling VoIP, the external interface may be enabled to connect through a default route (e.g., an IGD) that provides Internet connectivity for routing the voice traffic.

Figure 3:
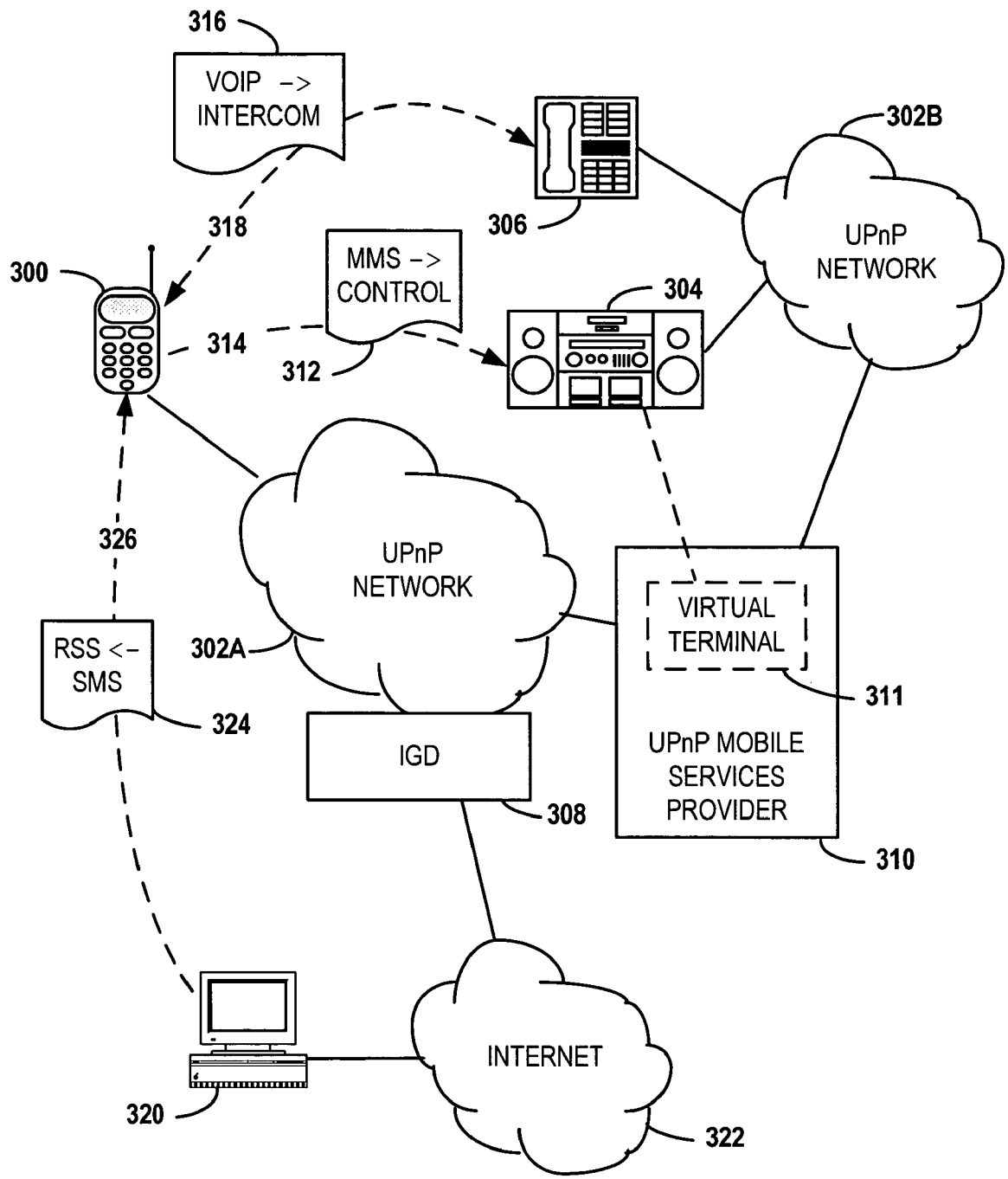
FIG. 3 illustrates exchanges between mobile devices and consumer electronics devices on an ad-hoc local area network according to embodiments of the present invention.

Any UPnP enabled device that is capable of exploiting mobile-specific services via UPnP may utilize the data computing structure 200. The UPnP enabled device (e.g., the cell phone 236) may use the mobile-specific services in the normal manner (e.g., voice phone calls, text messages) except that connectivity is provided via UPnP. The device 236 may be enabled to either manually or automatically utilize UPnP in this way for standard mobile services, whether the services are offered inside of or outside of the local network 224. The data computing structure 200 may also be adapted to allow the mobile device 236 to access entities locally coupled to the UPnP network 224 using the mobile services. In this latter configuration, the mobile device 236 uses existing mobile-specific services to access UPnP devices in way that may be specific to the devices in the local environment. An example of a UPnP enabled mobile device 300 interfacing with local elements of a UPnP network according to the present invention is shown in FIG. 3.

The mobile device 300 is capable of communicating via the segments of a UPnP network 302A-B. The mobile device 300 may be capable of communicating directly with consumer electronics devices on the network 302A-B, such as an audio system 304, a telephone 306, and an IGD 308. Additionally, the mobile device 300 is configured to utilize a UPnP mobile services provider device 310. The provider device 310 may act as an intermediary between the mobile device 300 and other elements of the UPnP network 302A-B.

One function of the UPnP mobile services provider device 310 may be to represent UPnP devices (e.g., the audio system 304) as devices that are addressable as if the devices were on mobile services network. For example, the provider device 310 can create a virtual mobile terminal 311 representing the audio system 304 for receiving MMS or SMS messages. Before setting up this virtual terminal 311, the provider device 310 may represent itself as a control point when connecting to the audio system 304. Through discovery and description, the provider device 310 can determine a set of commands that the audio system 304 can accept (e.g., volume up, next channel, etc). After the provider device 310 has established itself as a control point for the audio system 304, the provider device 310 can accept commands directed to the audio system 304 via the virtual terminal 311. The mobile terminal 300 can directly access this virtual terminal 311 through the provider device 310. The virtual terminal 311 may be represented using a phone number or URL that is only valid on the UPnP network 302A-B. The provider device 310 may set up any number of virtual terminals to accept data targeted for UPnP devices on the network.

Once the UPnP mobile services provider device 310 is configured, the user of the mobile device 300 may form a simple text message targeted for virtual terminal 311 located on the provider device 310. For example, the change a tuner channel on the entertainment center 304, the user may send an MMS message 312 directed to audio system 304, as indicated by path 314. The message may be an MMS message containing the text "c+," or something similarly representative of a channel-changing command. The MMS message 312 may be sent to a specially formed URL such as stereo1@ homenet. The provider device 310 will receive the message 312 and recognize the URL as being directed to the audio system 304. The provider device 310 will parse the MMS message 312 to create a properly formatted command that is sent to the audio system 304 via the UPnP network 302A-B.

The mobile device 300 may also utilize the UPnP mobile services provider device 310 for more complex data exchanges on the UPnP network 302A-B. For example, a home intercom may be formed using UPnP enabled phones/stations such as the phone 306. The provider device 310 may be enabled to conduct audio communications with the phone 306 via UPnP. These audio communications may be through vendor specific protocols that are not part of any mobile services standard. The mobile device 300 may be able to access the phone 306 via a mobile-specific voice interface of the provider device 310. Voice communications between the mobile device 300 and phone 306 are represented as the VoIP data 316 and virtual connection path 318. For example, the provider device 310 may set up a proxy SIP/VoIP interface used by the mobile device 300 to access the phone 306, even if the phone 306 does not use these protocols.

The UPnP mobile services provider device 310 may also be configured to asynchronously send selected data to the mobile device 300 via a mobile-specific service. For example, a Web server 320 may provide RSS news feeds to subscribers on the Internet 322. RSS is a format for syndicating news and other regularly updated content on the Web. RSS feeds are created when the originator of the content updates an XML document on the Web server that contains a title, link, and description of a news item. Many browsers support reading RSS feeds, and RSS functionality may be implemented in other programs. In the arrangement of FIG. 3, the UPnP mobile services provider device 310 may be configured to read RSS feeds via the IGD 308. The content of these feeds may be formatted into an SMS message 324 by the provider device 310 and sent to the mobile device 300 using SMS as indicated by path 326. The SMS message 324 can be read at the mobile device 310 using the device's SMS reader.

Because the mobile device 300 can already communicate via mobile-specific services, the mobile device 300 can communicate with devices on the UPnP network 302A-B via the provider device 310 without adding any application software. For example, the device 300 may act as a remote control for the audio system 304 by using the text message facilities built into the device 300. However, there may be advantages to providing application programs that exploit the device's capability to communicate on the UPnP network using mobile-specific services. For example, a remote control program executing on the device 300 may have labeled buttons and the like for easy activation of UPnP devices. Such an application may be easier to write if it can utilize the built-in messaging facilities of the device 300 rather than having to provide special drivers for accessing UPnP devices directly.

Figure 4:
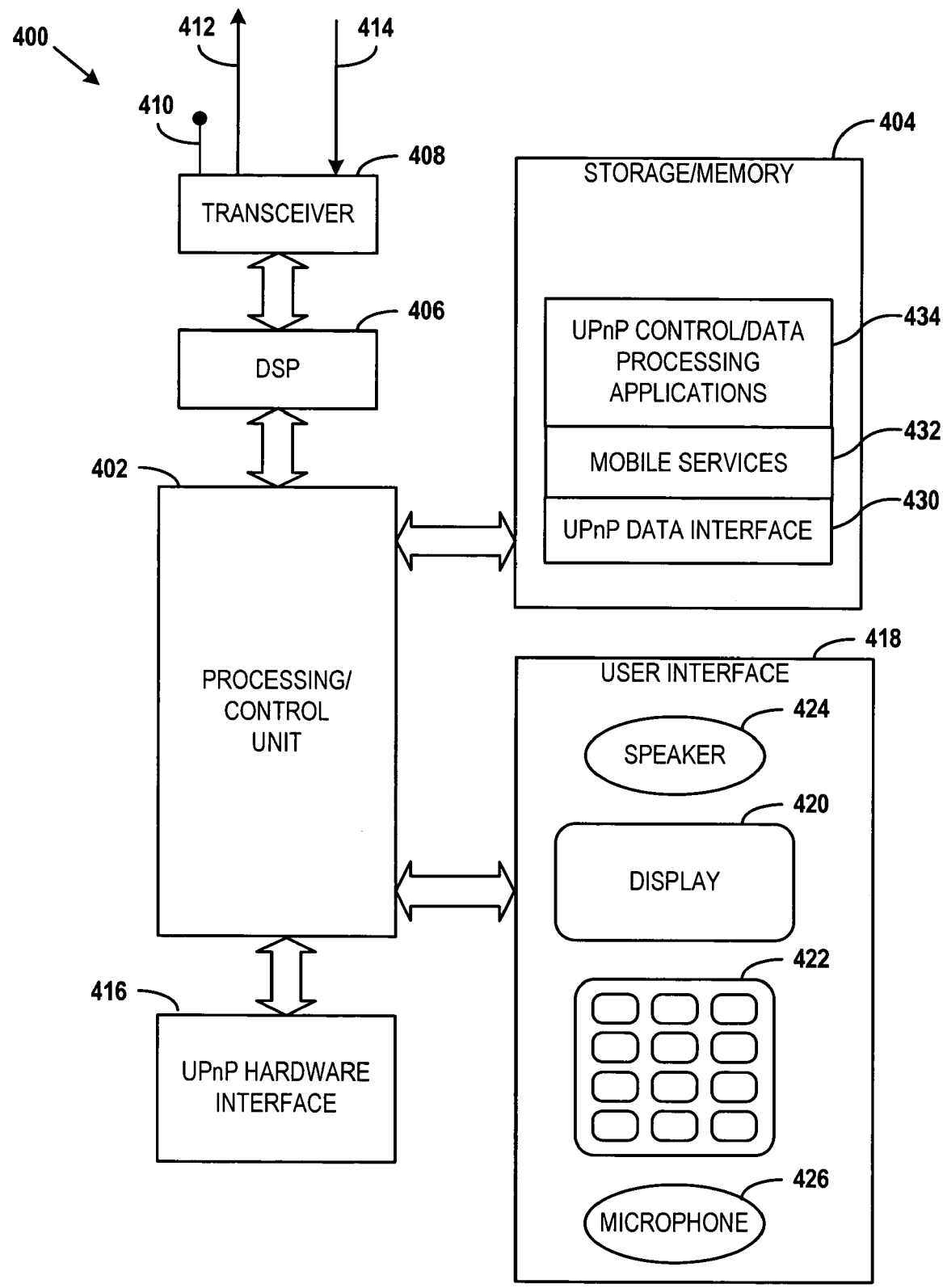
FIG. 4 illustrates a mobile terminal configured for utilizing mobile-specific services on an ad-hoc local area network according to embodiments of the present invention.

An example mobile computing arrangement 400 that is enabled to exploit a UPnP mobile services provider device according to embodiments of the present invention is shown in FIG. 4. Those skilled in the art will appreciate that the exemplary mobile computing arrangement 400 is merely representative of general functions that may be associated with such mobile devices, and also that landline computing systems similarly include computing circuitry to perform such operations.

The illustrated mobile computing arrangement 400 may be suitable for performing roles as both UPnP device and a UPnP control point. The mobile computing arrangement 400 includes a processing/control unit 402, such as a microprocessor, reduced instruction set computer (RISC), or other central processing module. The processing unit 402 need not be a single device, and may include one or more processors. For example, the processing unit may include a master processor and associated slave processors coupled to communicate with the master processor.

The processing unit 402 controls the basic functions of the arrangement 400. Those functions may be included as instructions stored in a program storage/memory 404. In one embodiment of the invention, the program modules associated with the storage/memory 404 are stored in non-volatile electrically-erasable, programmable read-only memory (EEPROM), flash read-only memory (ROM), etc. so that the information is not lost upon power down of the mobile terminal. The relevant software for carrying out conventional mobile terminal operations and operations in accordance with the present invention may also be transmitted to the mobile computing arrangement 400 via data signals, such as being downloaded electronically via one or more networks, such as the Internet and an intermediate wireless network(s).

The program storage/memory 404 may also include operating systems for carrying out functions and applications associated with functions on the mobile computing arrangement 400. The program storage 404 may include one or more of read-only memory (ROM), flash ROM, programmable and/or erasable ROM, random access memory (RAM), subscriber interface module (SIM), wireless interface module (WIM), smart card, hard drive, or other removable memory device.

The mobile computing arrangement 400 also includes hardware and software components coupled to the processing/control unit 402 for performing network data exchanges. The mobile computing arrangement 400 may include multiple network interfaces for maintaining any combination of wired or wireless data connections. In particular, the illustrated mobile computing arrangement 400 includes wireless data transmission circuitry for performing mobile service network data exchanges.

This wireless circuitry includes a digital signal processor (DSP) 406 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 408, generally coupled to an antenna 410, transmits the outgoing radio signals 412 and receives the incoming radio signals 414 associated with the wireless device.

The mobile computing arrangement 400 may also include a separate data interface 416 coupled to the processor 402 and adapted for communicating over a UPnP network. The UPnP interface 416 may include any combination of wired or wireless physical data transmission hardware. The circuitry of the UPnP interface 416 may be integrated with the circuitry of the DSP 406 and transceiver 408, or may be separately provided. The UPnP hardware interface 416 may be integrated into the mobile arrangement 400 or may be provided as an add-on peripheral device.

The mobile computing arrangement 400 also includes user-interface 418 elements coupled to the processor 402. The user-interface 418 of the arrangement 400 may include, for example, a display 420 such as a liquid crystal display, a keypad 422, speaker 424, and microphone 426. Other user-interface mechanisms may also be employed, such as voice commands, switches, touch pad/screen, graphical user interface using a pointing device, trackball, joystick, or any other user interface mechanism. These and other user-interface components are coupled to the processor 402 as is known in the art.

The program storage/memory 404 contains software used to operate the mobile computing arrangement 400. This software may include a UPnP interface module 430 which is coupled to the UPnP hardware interface 416. The UPnP interface module 430 allows connecting to and sharing data with elements of a UPnP network. Generally, interfacing with UPnP networks involves advertising services available via the mobile computing arrangement 400 and discovering and using advertised services of other devices.

The mobile computing arrangement 400 is typically able to utilize a number of mobile-specific services available on primary wireless service networks, including voice, text messaging, etc. These mobile-specific functions may be provided by one or more mobile services modules 432. The mobile services modules 432 may also be configured to access these services using any combination of hardware interfaces, including via the transceiver 408 and/or the UPnP hardware interface 416.

The mobile services module 432 may use the UPnP interfaces 416, 430 to access mobile-specific services from a locally situated UPnP mobile services provider (e.g., UPnP mobile services provider device 310 in FIG. 3). The local UPnP service provider may allow accessing UPnP functions of any devices via mobile-specific formats and protocols. To better utilize these UPnP services, the storage/memory 404 of the mobile arrangement 400 may include UPnP control and data processing applications 434. These applications 434 may act as a "wrapper" for accessing UPnP functionality via mobile services.

The UPnP applications 434 may present a user interface that is tailored for controlling and/or interfacing with specific UPnP devices. However, existing mobile services protocols are used instead of using the UPnP drivers to interface with these devices. A customized UPnP user interface that runs on top of existing mobile functionality can be easy to implement, memory efficient, and reliable. Ordinarily, implementing these UPnP features would require the application to include an entirely new stack of protocols specific to communicating with a particular UPnP device. However, the arrangement 400 already includes a sophisticated stack of data transfer protocols optimized for the mobile environment. By adapting the existing mobile services protocols provided by the mobile services module 432, there is no need to implement this additional stack of UPnP protocols. The logic used to translate between mobile-specific protocols and non-mobile-specific functions can be situated in an external device, such as a UPnP mobile services provider device.

For example, the arrangement 400 may include the ability to send, receive, and view images via MMS. However, arrangement 400 may not include the ability to access and control an external data store (e.g., a home media server) containing pictures that are stored in a wide variety of formats. To include an entire media server access protocol stack on the arrangement 400 would require significant amounts of memory. However, if the existing MMS protocol was used to access the media server, then a much more compact application 434 could be used. This compact application 434 would only need to contain the requisite user interface elements and some code to embed media server commands into MMS text messages (or other mobile-specific services and formats). Additional transformations, such as dealing with vendor specific commands and/or formatting images, can be performed externally by the local provider device. Performing transformations on the provider device provides performance benefits, because equivalent transformations performed on the mobile arrangement 400 would be much slower due to the relatively slower mobile processor 402.

The mobile computing arrangement 400 of FIG. 4 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 5:
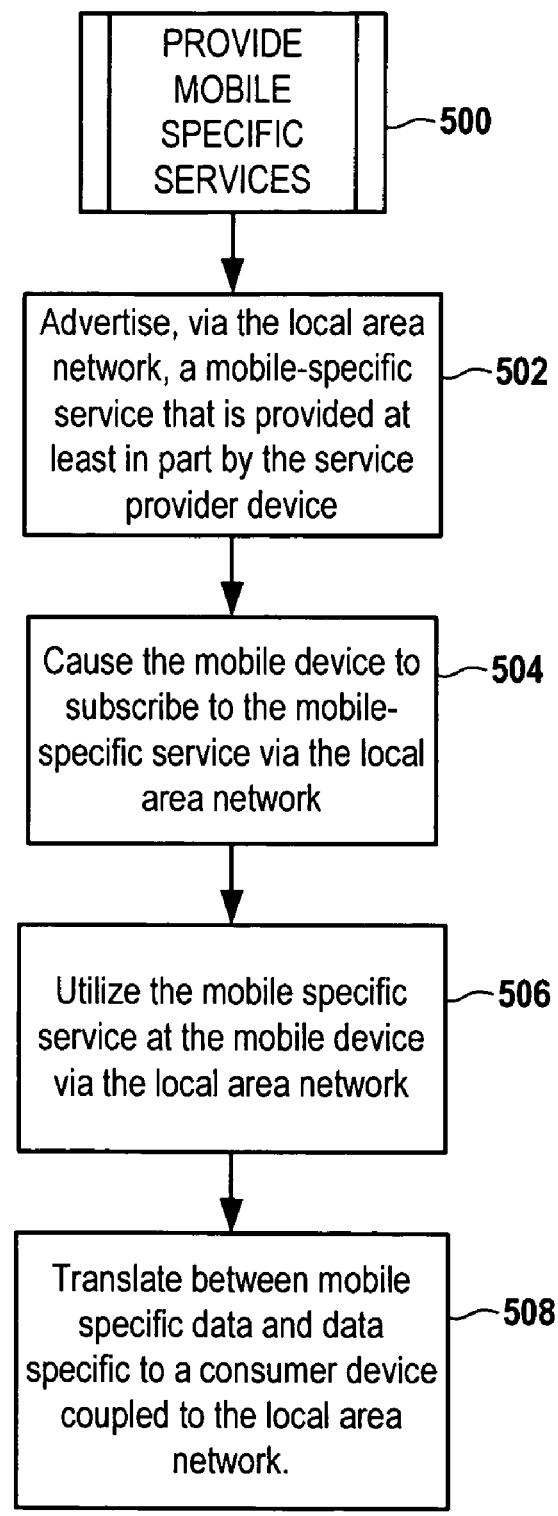
FIG. 5 illustrates a procedure for providing mobile-specific services on an ad-hoc local area network according to embodiments of the present invention.

Turning now to FIG. 5, a procedure 500 is illustrated for providing mobile-specific services on an ad-hoc local area network in accordance with embodiments of the present invention. Mobile-specific services are advertised 502 via the network. The mobile-specific services are provided, at least in part, by a service provider device coupled to the network. A mobile device subscribes 504 to the mobile-specific service via the local area network. The mobile device may then utilize 506 the mobile-specific services via the local area network. Optionally, the service provider may translate 508 between mobile-specific data and data that is specific to consumer devices coupled to the local area network.

Hardware, firmware, software or a combination thereof may be used to perform the various functions and operations described herein of a distributed-computation program. Articles of manufacture encompassing code to carry out functions associated with the present invention are intended to encompass a computer program that exists permanently or temporarily on any computer-usable medium or in any transmitting medium that transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a distributed-computation system, apparatus, and method in accordance with the present invention.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method comprising:
coupling a mobile device to a local area network that provides ad-hoc connectivity between consumer electronics devices;
advertising, via discovery protocols of the local area network, a mobile-specific service that is provided at least in part by a service provider device that is capable of being coupled to the network as a peer of the mobile device, wherein the mobile specific service comprises a Voice over IP service that is provided via an external mobile communications network;
receiving at the service provider device, a request from the mobile device to subscribe to the mobile-specific service in response to advertising of the mobile-specific service; and
providing the mobile-specific service to the mobile device via the service provider device in response to the request, wherein the service provider device bridges the Voice over IP service between the mobile device and the external mobile communications network.

2. The method of claim 1, wherein providing the mobile-specific service to the mobile device comprises accessing, via the service provider device, a server entity located outside the local area network that is configured to provide at least part of the mobile specific service.

3. The method of claim 1, wherein providing the mobile-specific service to the mobile device comprises accessing, via the service provider device, a server entity located within the local area network that is configured to provide at least part of the mobile specific service.

4. The method of claim 1, further comprising:
receiving mobile-specific data at the serVice provider device via the mobile-specific service;
forming, based on the mobile-specific data, translated data that is specific to a consumer electronics device coupled to the local area network; and
sending the translated data to the consumer electronics device via the local area network.

5. The method of claim 4, wherein forming the translated data comprises forming a command configured to remotely operate the consumer electronics device.

6. The method of claim 4, wherein forming the translated data comprises forming multimedia data that is compatible with a rendering function of the consumer electronics device.

7. The method of claim 1, further comprising:
receiving data at the service provider device via the local area network, wherein the data is specific to a consumer electronics device coupled to the local area network;
forming, based on the data, mobile-specific data that is compatible with the mobile-specific service; and
sending the mobile-specific data to the mobile device via the mobile-specific service.

8. The method of claim 7, wherein forming the mobile-specific data comprises forming multimedia data that is compatible with a rendering function of the mobile device.

9. The method of claim 1, wherein the local area network comprises a Universal Plug and Play network.

10. The method of claim 1, wherein the mobile specific service is specific to a cellular communications network.

11. The method of claim 10, wherein the mobile-specific service further comprises a mobile messaging service.

12. The method of claim 11, wherein the mobile messaging service comprises at least one of Short Message Service and Multimedia Message Service.

13. The method of claim 10 wherein the mobile-specific service further comprises a voice communication service.

14. The method of claim 13, wherein the voice communication service further comprises a Session Initiation Protocol (SIP) service.

15. The method of claim 1, wherein the mobile-specific service further comprises at least one of a SIP registrar service, a SIP redirect service, and a SIP proxy service.

16. A processor-readable medium having instructions stored thereon which are executable by a data processing arrangement capable of being coupled to a local area network that provides ad-hoc connectivity to consumer electronics devices, the instructions executable by the data processing arrangement for performing steps comprising:
   advertising, via discovery protocols of the local area network, a mobile-specific service that is provided at least in part by the data processing arrangement as a peer device. wherein the mobile specific service comprises a Voice over IP service that is provided via an external mobile communications network;
   receiving, in response to advertising the mobile-specific service, a request for the mobile-specific service from a mobile device that is configured to operate on the local area network; and
   providing the mobile-specific service to the mobile device via the local area network in response to the request, wherein providing the mobile-specific service comprises bridging the Voice over IP service between the mobile device and the external mobile communications network.

17. The processor-readable medium of claim 16, wherein the steps further comprise:
   receiving, from the mobile device, mobile-specific data that is transferred via the mobile-specific service;
   forming, based on the mobile-specific data, translated data that is specific to a consumer electronics device coupled to the local area network; and
   sending the translated data to the consumer electronics device via the local area network.

18. The processor-readable medium of claim 16, wherein the local area network comprises a Universal Plug and Play network.

19. The processor-readable medium of claim 16, wherein the mobile-specific service further comprises any combination of a Short Message Service, a Multimedia Message Service, a Session Initiation Protocol (SIP), a SIP registrar service, a SIP redirect service, and a SIP proxy service.

20. A processor-readable medium having instructions stored thereon which are executable by a mobile data processing arrangement capable of being coupled to a local area network that provides ad-hoc connectivity to consumer electronics devices, the instructions executable by the mobile data processing arrangement for performing steps comprising:
   discovering, via discovery protocols of the local area network, a mobile-specific service that is provided at least in part by a provider device coupled to the local area network as a peer of the mobile data processing arrangement, wherein the mobile specific service comprises a Voice over IP service that is provided via an external mobile communications network;
   sending a request for the mobile-specific service to the provider device via the local area network; and
   utilizing the mobile-specific service of the external mobile communications network via the provider device.

21. The processor-readable medium of claim 20, wherein the steps further comprise sending, via the provider device, data targeted for a consumer electronics device coupled to the local area network.

22. The processor-readable medium of claim 20, wherein the local area network comprises a Universal Plug and Play network.

23. The processor-readable medium of claim 20, wherein the mobile-specific service further comprises any combination of a Short Message Service, a Multimedia Message Service, a Session Initiation Protocol (SIP), a SIP registrar service, a SIP redirect service, and a SIP proxy service.

24. The processor-readable medium of claim 20, wherein the mobile data processing arrangement comprises a cellular phone.

25. A system comprising:
   a local area network configured to provide ad-hoc data exchanges between consumer electronics devices capable of being coupled to the local area network;
   means for advertising, via discovery protocols of the local area network, a mobile-specific service that is provided at least in part by a service provider device coupled as a peer device to the local area network, wherein the mobile specific service comprises a Voice over IP service that is provided via an external mobile communications network;
   means for causing a mobile device to subscribe to the mobile-specific service via the local area network; and;
   means for causing the mobile device to utilize the mobile-specific service of the external mobile communications network via the local area network.

26. The system of claim 25, further comprising:
   means for receiving mobile-specific data at the service provider device;
   means for translating the mobile-specific data to data that is specific to at least one of the consumer electronics devices; and
   means for sending to the at least one consumer electronics devices the data that is specific to the at least one consumer electronics devices.

27. The system of claim 25, further comprising:
   means for receiving data at the service provider device via the mobile-specific service, wherein the data is specific to a consumer electronics device that is coupled to the local area network;
   means for forming, based on the data, mobile-specific data that is compatible with the mobile-specific service; and
   means for sending the mobile-specific data to the mobile device.

28. An apparatus comprising:
   a network interface capable of being coupled to a local area network that provides ad-hoc connectivity to consumer electronics devices;
   a processor coupled to the network interface; and a memory coupled to the processor, the memory containing instructions that cause the processor to, advertise, via discovery protocols of the local area network, a mobile-specific service that is provided at least in part by the apparatus operating as a peer device on the local area network, wherein the mobile specific service comprises a Voice over IP service that is provided via an external mobile communications network;

receive a request for the mobile-specific service from a mobile device that is capable of operating on the local area network in response to advertising the mobile-specific service; and provide the mobile-specific service of the external mobile communications network to the mobile device via the local area network in response to the request.

29. The apparatus of claim 28, wherein the instructions further cause the processor to, receive, from the mobile device, mobile-specific data that is transferred via the mobile-specific service;

form, based on the mobile-specific data, translated data that is specific to a consumer electronics device coupled to the local area network; and send the translated data to the consumer electronics device.

30. The apparatus of claim 28, wherein the local area network comprises a Universal Plug and Play network.

31. The apparatus of claim 28, wherein the mobile-specific service further comprises any combination of a Short Message Service, a Multimedia Message Service, a Session Initiation Protocol (SIP), a SIP registrar service, a SIP redirect service, and a SIP proxy service.

32. The apparatus of claim 28, wherein the mobile-specific service is provided by a server entity located outside of the local area network.

33. The apparatus of claim 28, wherein the mobile-specific service is provided by a server entity located within the local area network.

34. A mobile terminal comprising:

a network interface capable of being coupled to a local area network that provides ad-hoc connectivity to consumer electronics devices;

a processor coupled to the network interface; and a memory coupled to the processor, the memory containing instructions that cause the processor to, discover, via discovery protocols of the local area network, a mobile-specific service that is provided at least in part by a provider device coupled as a peer device to the local area network, wherein the mobile specific service comprises a Voice over IP service that is provided via an external mobile communications network;

send a request for the mobile-specific service to the provider device; and utilize the mobile-specific service of the external mobile communications network via the provider device.

35. The mobile terminal of claim 34, wherein the instructions further cause the processor to, send, via the mobile-specific service, data targeted for a consumer electronics device coupled to the local area network.

36. The mobile terminal of claim 34, wherein the local area network comprises a Universal Plug and Play network.

37. The mobile terminal of claim 34, wherein the mobile-specific service further comprises any combination of a Short Message Service, a Multimedia Message Service, a Session Initiation Protocol (SIP), a SIP registrar service, a SIP redirect service, and a SIP proxy service.

* * * * *

UNITED STATES PATENT AND TRADEMARK OFFICE
CERTIFICATE OF CORRECTION

PATENT NO. : 7,346,341 B2 Page 1 of 1
APPLICATION NO. : 11/009375
DATED : March 18, 2008
INVENTOR(S) : Jose Costa-Requena et al.

It is certified that error appears in the above-identified patent and that said Letters Patent is hereby corrected as shown below:

Col. 14, Claim 4, line 45: "serVice" should be --service--.

Signed and Sealed this

Fifth Day of August, 2008

JON W. DUDAS
*Director of the United States Patent and Trademark Office*